US006561697B2

United States Patent
Tsui

(10) Patent No.: US 6,561,697 B2
(45) Date of Patent: May 13, 2003

(54) SUPPORT ASSEMBLY FOR A MOTOR SHAFT OF A CENTRIFUGAL SUBMERSIBLE PUMP

(75) Inventor: Shu-Chen Tsui, Taichung Hsien (TW)

(73) Assignee: Sea Chung Electric Co., Ltd., Taiwan (CN)

( * ) Notice: Subject to any disclaimer, the term of this patent is extended or adjusted under 35 U.S.C. 154(b) by 0 days.

(21) Appl. No.: 09/891,063

(22) Filed: Jun. 25, 2001

(65) Prior Publication Data

US 2002/0196988 A1 Dec. 26, 2002

(51) Int. Cl.[7] ............................................. F16C 17/06
(52) U.S. Cl. ...................................................... 384/304
(58) Field of Search ................................. 384/304, 303, 384/302, 308

(56) References Cited

U.S. PATENT DOCUMENTS 3,154,355 A * 10/1964 McCafferty .................. 384/304
3,734,581 A * 5/1973 LeBreton ..................... 384/304

* cited by examiner

Primary Examiner—Lenard A. Footland
(74) Attorney, Agent, or Firm—Pearne & Gordon LLP

(57) ABSTRACT

A support assembly has two support devices. Each support device has a base, a bearing seat with a thrust bearing and a thrust journal. The two support devices can support the shaft together. The force applied to the structure of each support device is reduced, and the friction between each thrust journal and the corresponding thrust bearing is also reduced. The useful life of the support assembly is prolonged.

13 Claims, 4 Drawing Sheets

US 6,561,697 B2

SUPPORT ASSEMBLY FOR A MOTOR SHAFT OF A CENTRIFUGAL SUBMERSIBLE PUMP

BACKGROUND OF THE INVENTION

1. Field of the Invention

The present invention relates to a support assembly, and more particularly to a support assembly for a motor shaft for a centrifugal submersible pump and having two support devices to bear the weight of the entire centrifugal submersible pump.

2. Description of Related Art

With reference to FIG. 4, a support device (60) is always mounted on the bottom of a motor assembly (50) of a centrifugal submersible pump to support the motor shaft (520). The conventional support device (60) in accordance with the prior art comprises a base (61), a bearing seat (63) and a thrust journal (62). The base (61) is securely attached to the bottom of a housing (51) of the motor (52). The base (61) is composed of a bottom and a wall extending upward from the periphery of the bottom. A screw (65) with a ball tip is screwed into a threaded hole defined in the bottom of the base (61). The bearing seat (63) is mounted in the base (61) and supported on the screw (65). An indent is defined in the bottom of the bearing seat (63) to receive the ball tip of the screw (65). A thrust bearing (64) is secured to the top of the bearing seat (63). The thrust journal (62) is attached to the free end of the motor shaft (520) and abuts the thrust bearing (62). A key (not shown) and a keyway (not shown) are respectively arranged on the shaft (520) and the thrust journal (62), such that the thrust journal (62) will rotate with the shaft (520) relative to the bearing seat (63).

In operation, when the motor (52) is switched on, the shaft (520) will rotate and drive a pump assembly (not shown) to pump the water. The thrust journal (62) rotates with the shaft (520) relative to the thrust bearing (64). The bearing seat (63) supports the shaft (520) to keep the shaft (520) from axially move due to the weight of the centrifugal submersible pump and the pressure generated when pumping the water.

However, because there is only one support device (60) to support the shaft (520), the thrust journal (62), the bearing seat (63) and the screw (65) bear the weight of the entire centrifugal submersible pump. A huge force will be applied to the thrust journal (62), the bearing seat (63) and the screw (65). The thrust journal (62), the bearing seat (63) and the screw (65) are easily be damaged. The friction between the thrust journal (62) and the thrust bearing (64) is very large, so the thrust bearing (64) is easily worn down. The useful life of the support device (60) is short.

To overcome the shortcomings, the present invention provides an improved support assembly to mitigate or obviate the aforementioned problems.

SUMMARY OF THE INVENTION

The main objective of the invention is to provide an improved support assembly for a motor shaft of a centrifugal submersible pump and having two support devices to support the shaft. The support assembly is comprised of a first support device and a second support device. The first support device has a base, a bearing seat with a thrust bearing and a thrust journal. The second support device has a base, a second bearing seat with a thrust bearing and a thrust journal. The first support device and the second support device can support the shaft together. The force applied to each part is reduced, and the friction between each thrust journal and the corresponding thrust bearing is also reduced. The useful life of the support assembly is prolonged.

Other objects, advantages and novel features of the invention will become more apparent from the following detailed description when taken in conjunction with the accompanying drawings.

DETAILED DESCRIPTION OF PREFERRED EMBODIMENT

Figure 1:
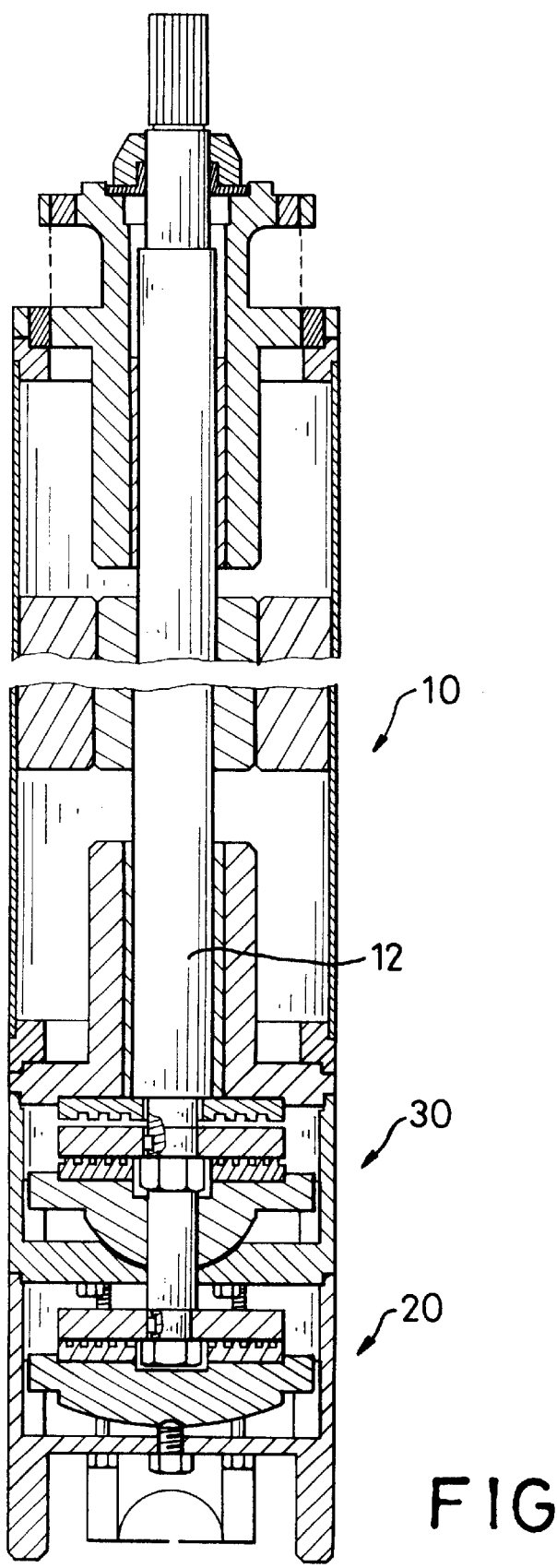
FIG. 1 is a side plan view of a support assembly for a motor shaft for a centrifugal submersible pump in accordance with the present invention.
Figure 2:
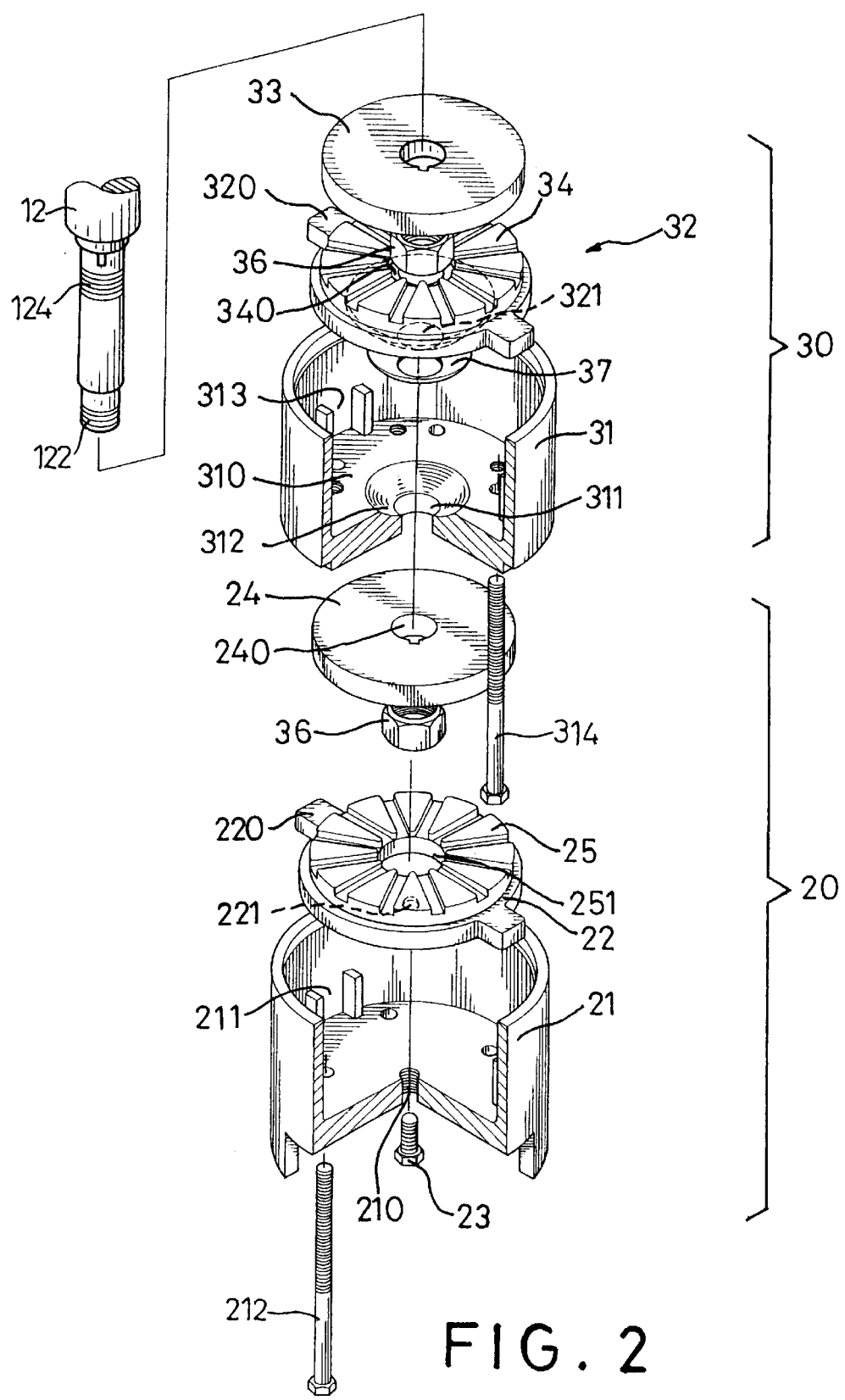
FIG. 2 is an exploded perspective view in partial section of a the support assembly in FIG. 1.
Figure 3:
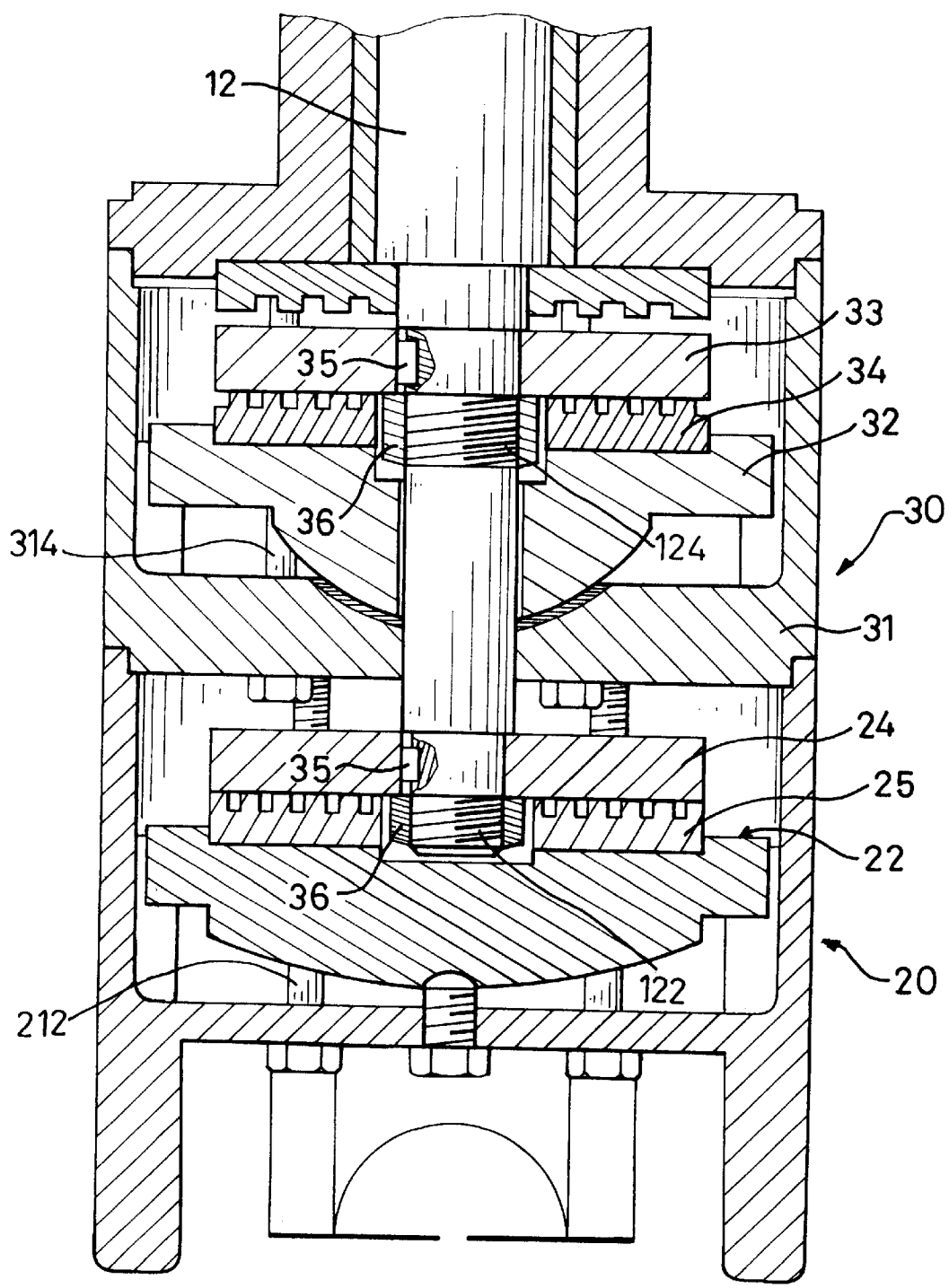
FIG. 3 is an enlarged side plan view in partial section of the support assembly in FIG. 1.
Figure 4:
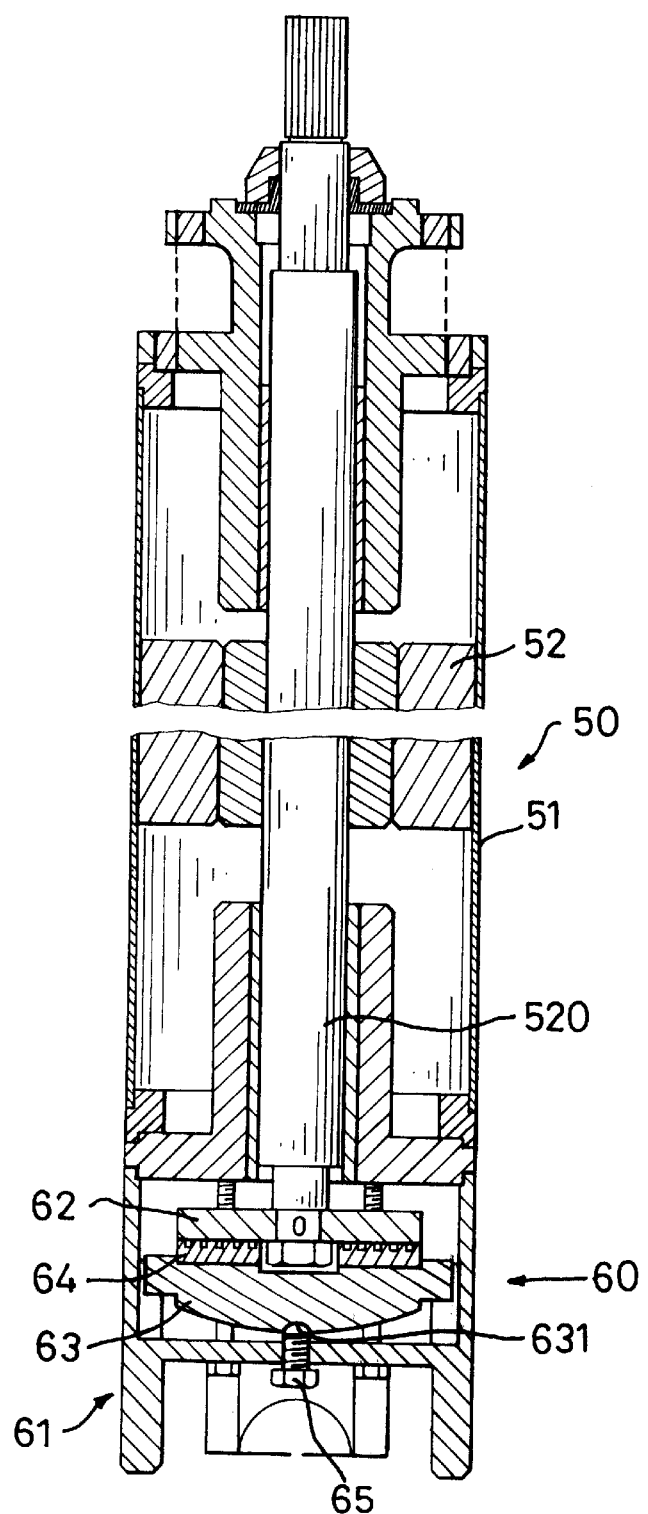
FIG. 4 is a side plan view of with a conventional support device for a centrifugal submersible pump in accordance with the prior art.

With reference to FIGS. 1 to 3, a support assembly for a motor shaft (12) of a centrifugal submersible pump in accordance with the present invention comprises a first support device (20) and a second support device (30). The first support device (20) is arranged below the second support device (30) to support the second support device (30).

The first support device (20) is composed of a first base (21), a bearing seat (22), a thrust bearing (25) and a thrust journal (24). The base (21) has a bottom and a wall extending upward from the periphery of the bottom. The bearing seat (22) is mounted in the first base (21). An adjusting screw (23) is screwed into a threaded hole (210) defined in the bottom of the base (21). A ball tip (not numbered) is formed on the top of the screw (23) and abuts the bottom of the bearing seat (22). A depression (221) is defined in the bottom of the bearing seat (22) to receive the ball tip of the screw (23). Two tracks (211) are defined in the inner surface of the wall, and an ear (220) extends radially from the bearing seat (22) to be slidably mounted in each track (211). Consequently, the bearing seat (22) will not rotate relative to the base (21) and is supported on the adjusting screw (23). A thrust bearing (25) is attached to the top of the bearing seat (22). A hole (251) is defined in the center of the thrust bearing (25).

The thrust journal (24) is securely attached to the free end of the shaft (12). In practice, an outer thread (122) is formed on the free end of the shaft (12). A central hole (240) is defined in the thrust journal (24), and the free end of the shaft (12) extends into the central hole (240). A stepped flange (not numbered) is formed near the free end of the shaft (12). With such an arrangement, the free end of the shaft (12) extends through the central hole (240) in the thrust journal (24), and the thrust journal (24) abuts the stepped flange. A nut (36) is screwed onto the outer thread (122) to hold the thrust journal (24) on the shaft (12). In addition, a key (35) and a keyway (not numbered) are respectively formed on the shaft (12) and the inner surface of the central hole (240) in the thrust journal (24). Accordingly, the thrust journal (24) will rotate with the shaft (12). The second support device (30) is composed of a second base (31), a bearing seat (32) and a thrust journal (33). The base (31) of the second support device (30) is securely attached to the base (21) of the first support device (20) with bolts (212). The base (31) is securely attached to the bottom of the housing of the motor assembly (10) with bolts (314). The base (31) has a bottom (310) and a wall extending upward from the periphery of the bottom (310). A concave recess (312) is defined in a central portion of the bottom (310). A through hole (311) is defined in the face defining the concave recess (312) and aligns with the hole (251) in the thrust bearing (25) of the first support device (20).

The bearing seat (32) is received in the second base (31). A convex protrusion (not numbered) is formed on the bottom of the bearing seat (32) and received in the concave recess (312) in the base (31). A through hole (321) is defined through the bearing seat (32) and aligns with the through hole (311) in the second base (31). Two tracks (313) are defined in the inner surface of the wall, and an ear (320) extends radially from the bearing seat (32) to extend into each track (313). Consequently, the bearing seat (32) is mounted in the second base (31) and does not rotate relative to the base (31). A thrust bearing (34) is attached to the top of the bearing seat (32). A through hole (340) is defined in the central portion of the thrust bearing (34) and aligns ands communicates with the through hole (321) in the bearing seat (32).

The thrust journal (33) is securely attached to the shaft (12). An outer thread (124) is formed on the shaft (12). A central hole (not numbered) is defined through the thrust journal (33). A stepped flange (not numbered) is formed near the outer thread (124) on the shaft (12). With such an arrangement, the free end of the shaft (12) extends through the central hole in the thrust journal (33), and the thrust journal (33) abuts the stepped flange near the thread (124). A nut (36) is screwed onto the outer thread (124) to hold the thrust journal (33) on the shaft (12). In addition, a key (35) and a keyway (not shown) are respectively formed on the shaft (12) and the inner surface of the central hole in the thrust journal (33). Accordingly, the thrust journal (33) will rotate with the shaft (12).

In assembly, the shaft (12) extends through the thrust journal (33) of the second support device (30), and the nut (36) screws onto the thread (124) on the shaft (12) to secure the thrust journal (33) on the shaft (12). The shaft (12) extends through the through holes (321, 340) in the thrust bearing (34) and the bearing seat (32), and the nut (36) is received in the through hole (340) in the wearing-resisting disk (34). The shaft (12) then extends through the through hole (311) in the second base (31), and the second base (31) is attached to the housing with bolts (314). Consequently, the second support device (30) is assembled to the motor assembly (10) of the centrifugal submersible pump.

The shaft (12) then extends through the central hole (251) in the thrust journal (25) of the first support device (20), and the nut (36) is screwed onto the thread (122) on the shaft (12). The bearing seat (22) with the thrust bearing (25) is inserted into the first base (21), and the screw (23) is screw into the threaded hole (210) in the first base (21) with the tip extending into the depression (221) in the bearing seat (22). The first base (21) is secured to the second base (31) of the second support device (30) with bolts (212), and the free end of the shaft (12) and the nut (36) are received in the hole (251) in the thrust bearing (25). Consequently, the first support device (20) is attached to the motor assembly (10) of the centrifugal submersible pump. Accordingly, the first support device (20) and the second support device (30) support the shaft (12) simultaneously.

In operation of the centrifugal submersible pump, the thrust journals (24, 33) will rotate with the shaft (12) and abut the thrust bearings (25, 34). Because the thrust journals (24, 33) respectively abut the stepped flanges on the shaft (12) and are respectively supported by the bearing seats (22, 32), the shaft (12) is simultaneously supported by the bearing seats (22, 32). The support devices (20, 30) support the weight of the entire centrifugal submersible pump together. The force applied to each thrust journal (24, 33) can be reduced, such that the friction between each thrust journal (24, 33) and the corresponding thrust bearing (25, 34) is also reduced. The useful life of each thrust bearing (25, 34) and the whole support assembly are extended.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A support assembly for a motor shaft of a centrifugal submersible pump, the support assembly comprising:
    a first support device adapted to support the motor shaft and including:
        a first base;
        a first bearing seat mounted in the base;
        a first thrust bearing attached to a top of the first bearing seat; and
        a first thrust journal abutting the first thrust bearing and adapted to securely attach to the shaft; and
    a second support device arranged above and supported on the first support device, and the second support device including:
        a second base configured for the shaft to extend through the base;
        a second bearing seat received in the second base and configured for the shaft to extend through the second bearing seat;
        a second thrust bearing attached to a top of the second bearing seat and configured for the shaft to extend through the second thrust bearing; and
        a second thrust journal abutting the second thrust bearing and adapted to securely attach the shaft,
    wherein the second base has a bottom with a periphery;
    a concave recess is defined in a central portion of the bottom of the second base; and
    a convex protrusion is formed on a bottom of the bearing seat and received in the concave recess in the second base to support the second bearing seat in the second base,
    whereby the first support device and the second support device are adapted to support the shaft together.

2. The support assembly as claimed in claim 1, wherein the first base has a bottom and a wall extending upward from a periphery of the bottom to receive the first bearing seat.

3. The support assembly as claimed in claim 2, wherein a threaded hole is defined in the bottom of the first base;
    a screw is screwed into the threaded hole and has a ball tip formed on a top of the screw to abut the first bearing seat.

4. The support assembly as claimed in claim 3, wherein a depression is defined in the bottom of the bearing seat to receive the ball tip of the screw.

5. The support assembly as claimed in claim 2, wherein two tracks are defined in an inner surface of the wall of the first base; and an ear extends radially from the first bearing seat to extend into each track so as to keep the first bearing seat from rotating relative to the first base.

6. The support assembly as claimed in claim 1, wherein a hole is defined in a central portion of the second thrust bearing to be adapted to receive a free end of the shaft.

7. The support assembly as claimed in claim 1, wherein a central hole is defined through the first thrust journal and configured for a free end of the shaft to extend through the central hole; and a nut is adapted to be screwed onto the shaft to hold the first thrust journal on the shaft.

8. The support assembly as claimed in claim 1, wherein the second base of the second support device is securely attached to the first base of the first support device with bolts.

9. The support assembly as claimed in claim 8, wherein the second base has a wall extending upward from the periphery of the bottom to receive the second bearing seat.

10. The support assembly as claimed in claim 9, wherein two tracks are defined in an inner surface of the wall of the second base; and an ear extends radially from the second bearing seat to extend into each track to keep the second bearing seat from rotating relative to the second base.

11. The support assembly as claimed in claim 1, wherein a through hole is defined in a face defining the concave recess and configured for the shaft to extend through the through hole in the second base;

a through hole is defined through the second bearing seat and configured for the shaft to extend through the through hole in the second bearing seat;

a through hole is defined in a central portion of the second thrust bearing and configured for the shaft to extend through the through hole in the second thrust bearing; and a central hole is defined through the second thrust journal and configured for the shaft to extend through the central hole in the second thrust journal; and a nut is adapted to be screwed onto the shaft to hold the second thrust journal on the shaft.

12. A support assembly for a motor shaft of a centrifugal submersible pump, the support assembly comprising:

a first support device adapted to support the motor shaft and including:
a first base;
a first bearing seat mounted in the base;
a first thrust bearing attached to a top of the first bearing seat; and
a first thrust journal abutting the first thrust bearing and adapted to securely attach to the shaft; and a second support device arranged above and supported on the first support device, and the second support device including:
a second base configured for the shaft to extend through the base;
a second bearing seat received in the second base and configured for the shaft to extend through the second bearing seat;
a second thrust bearing attached to a top of the second bearing seat and configured for the shaft to extend through the second thrust bearing; and
a second thrust journal abutting the second thrust bearing and adapted to securely attach the shaft, whereby the first support device and the second support device are adapted to support the shaft together, the first base having a bottom and a wall extending upwardly from the periphery of the bottom to receive the first bearing seat, two tracks defined in an inner surface of the wall of the first base; and an ear extends radially from the first bearing seat to extend into each track so as to keep the first bearing seat from rotating relative to the first base.

13. A support assembly for a motor shaft of a centrifugal submersible pump, the support assembly comprising:

a first support device adapted to support the motor shaft and including:
a first base;
a first bearing seat mounted in the base;
a first thrust bearing attached to a top of the first bearing seat; and
a first thrust journal abutting the first thrust bearing and adapted to securely attach to the shaft; and a second support device arranged above and supported on the first support device, and the second support device including:
a second base configured for the shaft to extend through the base;
a second bearing seat received in the second base and configured for the shaft to extend through the second bearing seat;
a second thrust bearing attached to a top of the second bearing seat and configured for the shaft to extend through the second thrust bearing; and
a second thrust journal abutting the second thrust bearing and adapted to securely attach the shaft, whereby the first support device and the second support device are adapted to support the shaft together, the first base having a bottom and a wall extending upwardly from the periphery of the bottom to receive the first bearing seat, a threaded hole defined in the bottom of the first base, a screw screwed into the threaded hole and a ball tip formed on a top of the screw to abut the first bearing seat.

* * * * *